United States Patent [19]
Wilber

[11] 3,713,735
[45] Jan. 30, 1973

[54] DOCUMENT TRANSPORT MECHANISM

[75] Inventor: Thomas W. Wilber, Albuquerque, N. Mex.

[73] Assignee: The Singer Company, New York, N.Y.

[22] Filed: Sept. 10, 1971

[21] Appl. No.: 179,346

[52] U.S. Cl. ..................355/11, 355/16, 355/50, 355/64
[51] Int. Cl. .............................................G03g 15/00
[58] Field of Search........355/3, 8, 10, 11, 16, 50–51, 355/64

[56] References Cited

UNITED STATES PATENTS

| | | | |
|---|---|---|---|
| 3,600,082 | 8/1971 | Knechtel et al. | 355/16 X |
| 3,361,113 | 1/1968 | Hoffman et al. | 355/11 X |
| 3,512,884 | 5/1970 | Murgas et al. | 355/51 |
| 3,322,031 | 5/1967 | Ostensen | 355/10 X |
| 3,484,164 | 12/1969 | Byland | 355/51 X |
| 3,514,203 | 5/1970 | Zerfahs | 355/10 |

*Primary Examiner*—Samuel S. Matthews
*Assistant Examiner*—Richard A. Wintercorn
*Attorney*—Warren P. Kujawa et al.

[57] ABSTRACT

A document handling device comprising a document feed magazine removably supported by a pair of guide tracks in a main frame. The document feed magazine has a rotatable rear roller, a feed roller and associated pressure rollers forward of the rear roller, a diverting member adjustable between a document eject and a document re-enter position forward of the feed roller, and a simple latch for releasably locking the magazine in the guide tracks. Entry feed is provided by the magazine feed roller and pressure rollers mounted in the main frame; exit feed is provided by the feed roller and the associated magazine pressure rollers. Document turnaround is provided by the rear roller in cooperation with a document deflector, which may comprise a movable photoconductive web in an electrostatic copier, located in the main frame adjacent the rear roller.

17 Claims, 5 Drawing Figures

PATENTED JAN 30 1973

INVENTOR.
THOMAS W. WILBER
BY
Warren P. Kujawa

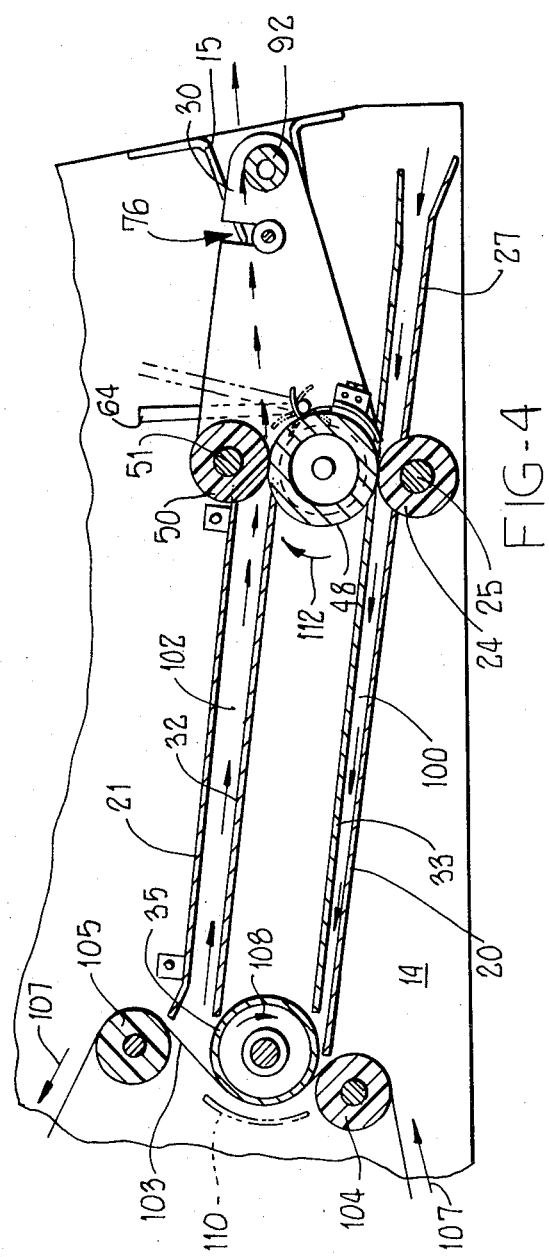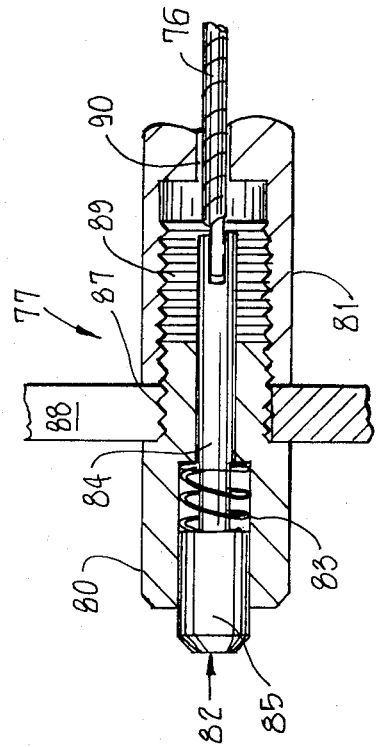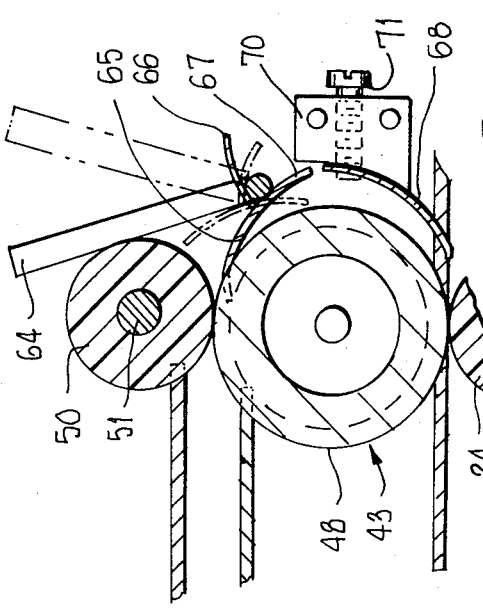

DOCUMENT TRANSPORT MECHANISM

BACKGROUND OF THE INVENTION

1. Field of the Invention

This invention relates to document transport mechanisms of the type used to convey an individual document from an entrance to an exit along a predetermined reversal path so that the direction of travel of the document near the exit is reversed from that near the entrance. More particularly, this invention relates to devices of the above type which include a document diverting member whereby the document may be either ejected at a predetermined point along the exit path or reinserted at a predetermined point along the entrance path.

2. Description of the Prior Art

Many document processing machines are known in which a document to be processed is introduced at an entrance, transported into the machine, processed at an internal site, transported within the machine to an exit, and then ejected. In some copying machines, e.g., an original document to be reproduced is introduced into the copier, transported past an exposure station where a light image of the original is obtained for reproduction purposes, after which the document is ejected from the copier.

In many such document processing machines, it has been found that the optimum feed path for the document in the machine—from the standpoint of both minimum required machine size and maximum operator convenience—is realized if the original document is required to follow a reversal path. A reversal path may be defined as a path along which the direction of document travel is substantially reversed as the document travels from the entrance to the exit. Examples of electrostatic copiers having a reversal type of original document feed path are disclosed in U.S. Pat. Nos. 3,088,386, 3,168,022, and 3,441,345.

In many document processing machines, it is frequently necessary to recycle all or some of the particular documents individually introduced into the machine. Some copying machines, e.g., are provided with a multicopy mode feature wherein an operator may select a desired number of copies to be reproduced from the same original document by manually setting a dial or switch to the desired number of copies. In many copiers with such a feature, the original document transport mechanism must respond to this selection by recycling the original document past the exposure station the proper number of times to enable production of the desired number of copies before ejecting the original document from the copier. Some document processing machines having a reversal type original document feed path are known which are provided with an original document recycling mechanism. U.S. Pat. Nos. 3,099,944; 3,181,420; 3,272,100; and 3,343,450 all disclose electrostatic copiers having both a reversal type original document feed path and original document recycling mechanisms of varying complexity.

A problem frequently encountered in document processing machines is jamming of the original document as it travels along the machine feed path. Jamming, which can occur for a variety of reasons, is highly undesirable in that it causes other machine malfunctions and also can quickly lead to total destruction of the original document, which may be irreplaceable, unless swiftly remedied. Efforts have been made to design document transport mechanisms which facilitate paper jam removal, but the resulting devices have proven to be complicated and prone to failure, and generally have not met with great success.

SUMMARY OF THE INVENTION

The present invention comprises a reversal path type of document transport device having a document recycling mechanism and which is simple in construction, highly reliable in operation, and suitable for use in a wide variety of document processing machines. Further, the present invention enables paper jams to be easily removed by non-skilled machine operators in a very short time.

Briefly described the invention comprises a document feed magazine removably supported by a pair of guide tracks in a main frame. The document feed magazine has a rotatable roller mounted at the rear, a feed roller and associated pressure rollers mounted forwardly of the rear roller, a document diverting member mounted forwardly of the feed roller adjustable between a first position permitting document feed in a direction forward of the feed roller and a second position permitting document feed in a direction rearward of the feed roller, and a simple latch for releasably locking the magazine in the guide tracks. Document entry feed is provided by the magazine feed roller and pressure rollers mounted in the main frame; document exit feed is provided by the magazine feed roller and the associated magazine pressure rollers. Document turnaround is provided by the rear roller in cooperation with a document deflector located in the main frame adjacent the rear roller. In a preferred embodiment, the document deflector comprises a movable photoconductive web of the type employed in electrostatic copiers.

BRIEF DESCRIPTION OF THE DRAWINGS

FIG. 3 is a sectional view taken along the lines 3—3 of FIG. 1 illustrating the magazine latch;

FIG. 4 is a sectional view taken along lines 4—4 of FIG. 1 illustrating the operation of the preferred embodiment with the magazine installed in the main frame; and FIG. 5 is an enlarged sectional view taken from FIG. 4 illustrating the operation of the document diverting member of the device.

DESCRIPTION OF THE PREFERRED EMBODIMENT

Figure 1:
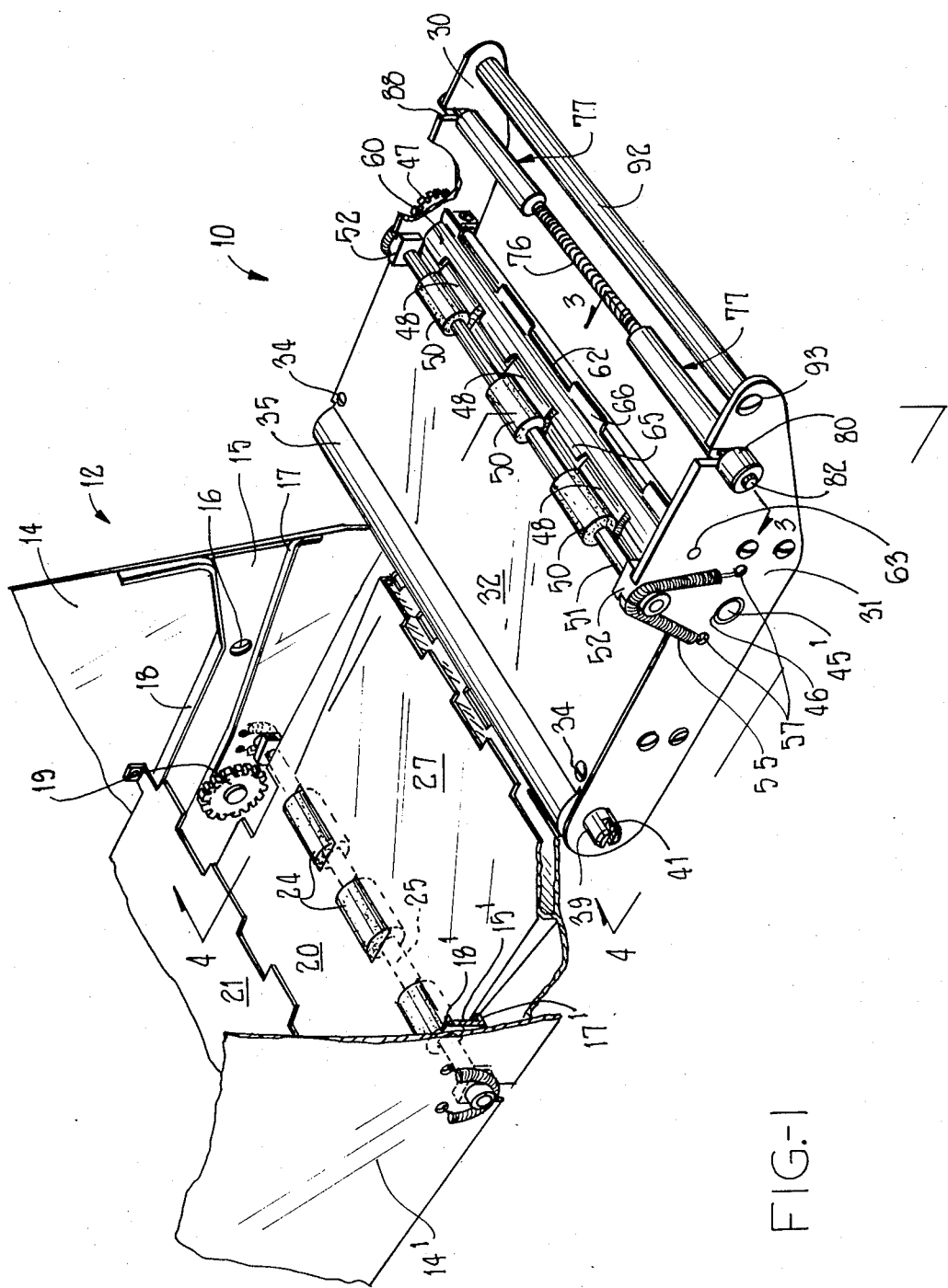
FIG. 1 is a perspective view partially broken away of a preferred embodiment of the invention.

Turning now to the drawings illustrating the preferred embodiment of the invention, FIG. 1 shows a document feed magazine 10 removed from a main frame 12. For the sake of clarity, main frame 12 is partially broken away. Mounted on the inner side of a pair of main frame side plates 14, 14' is a pair of guide tracks 15, 15' each having a latch pin aperture 16 for a purpose described below, and guide ledges 17, 18, and 17', 18' for supporting and guiding magazine 10 during insertion and removal thereof. As is evident from FIG. 1, guide ledges 17, 18 and 17', 18' are flared outwardly toward the front of the main frame 12 to facilitate insertion and removal of magazine 10. While guide tracks 15, 15' may be constructed from any suitable material known to those skilled in the art, they are preferably constructed from Delrin, Teflon, or any similar moldable material.

Rotatably fastened on the inner side of right side plate 14 below guide track 15 is a main driving gear 19, powered by a suitable driving mechanism (not shown) for driving the magazine feed roller described below.

A lower main frame guide plate 20 and an upper main frame guide plate 21 are secured between main frame side plates 14, 14'. The forward edge of guide plate 20 is provided with a plurality of rectangular indentations for accommodating a plurality of rotatably mounted resilient pressure rollers 24. Pressure rollers 24 are each mounted on a rotatable common shaft 25 indicated by hidden lines with a portion of the surface of each roller 24 extending above the plane of lower main frame guide plate 20. Shaft 25 is resiliently mounted in main frame 12 by means identical with that described in detail below in conjunction with the description of the pressure roller assembly located in magazine 10.

An entry chute 27, which is flared toward the front of main frame 12, is secured forward of pressure rollers 24. The forward edges of entry chute 27 are provided with rectangular indentations adapted to accommodate auxiliary feed rollers (not shown) which may be part of the outlet portion of an associated document feeding device which forms no part of the invention.

The forward edge of upper main frame guide plate 21 is likewise provided with a plurality of rectangular indentations for accommodating a plurality of pressure rollers carried by magazine 10 when this unit is installed in main frame 12.

Figure 2:
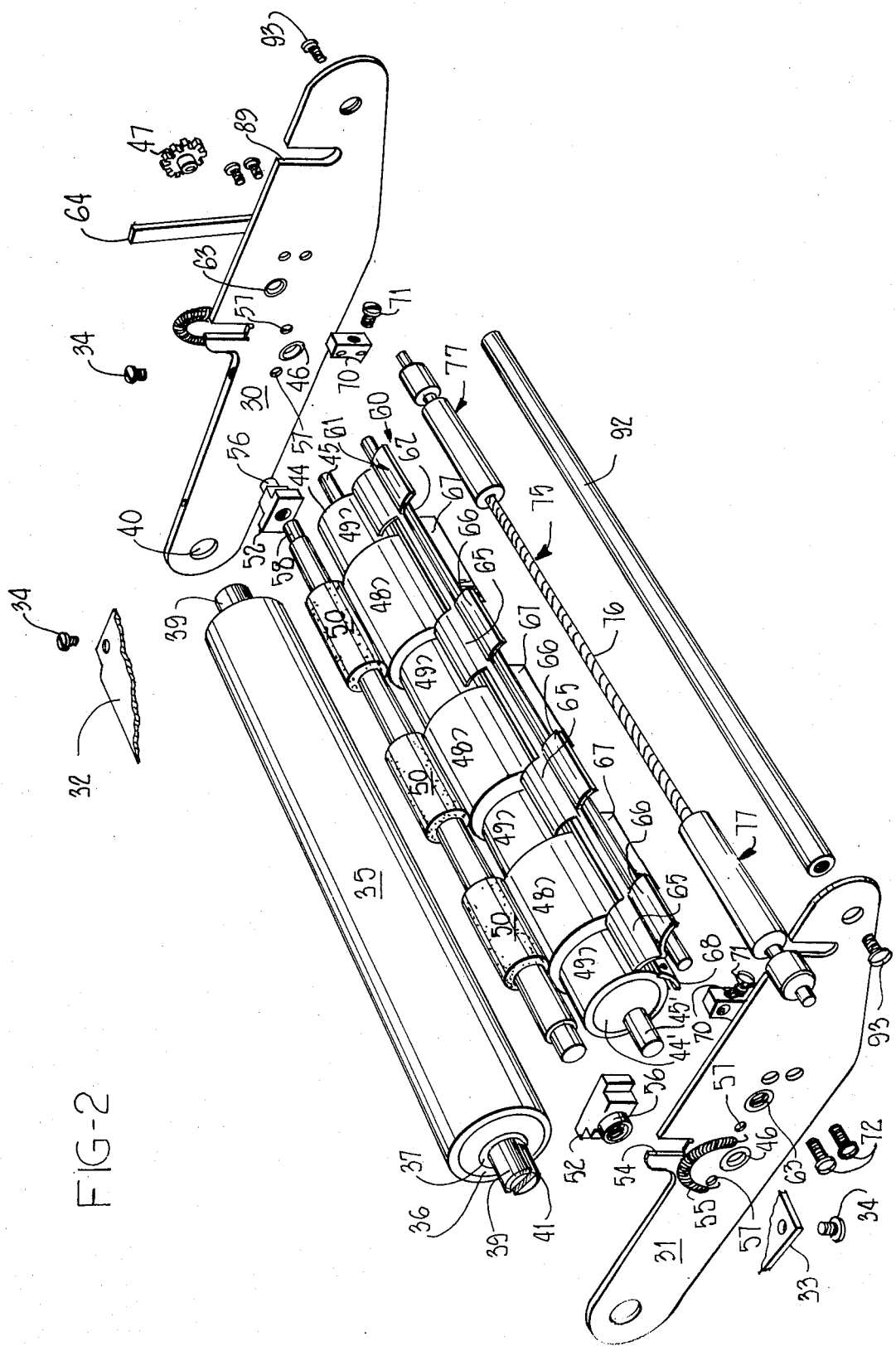
FIG. 2 is an exploded view of the document feed magazine of the preferred embodiment.

With reference to FIGS. 1 and 2, document feed magazine 10 includes a housing comprising right and left side plates 30, 31, and top and bottom plates 32, 33 secured thereto by screws 34.

A rear roller 35 has a pair of similar end walls 36 each having an axially concentric bearing 38 for receiving the inner end of a stub shaft 39 in a friction fit. Rear roller 35 is rotatably mounted at the rear of magazine 10 by force fitting each stub shaft 39 into an undersized aperture 40 in side plates 30, 31. As best seen in FIG. 1, in the assembled magazine 10 stub shafts 39 extend transversely of side plates 30, 31 to provide mechanical support for the rear portion of magazine 10. In the preferred embodiment, stub shafts 39 are each provided with a slot 41 engageable with a support member (not shown) fixed to the main frame 12 at the rear of guide tracks 15, 15'.

A feed roller 43 mounted forwardly of rear roller 35 has a pair of similar end caps 44, 44' each having an axial end shaft 45, 45' extending therefrom. Each end shaft 45, 45' is journaled in a bearing insert 46 mounted in side plates 30, 31. Right end shaft 45 extends a sufficient distance to the outside of right side plate 30 to accommodate a driven gear 47, which is engageable with driving gear 19 for rotating feed roller 43 when magazine 10 is installed in main frame 12.

Feed roller 43 has a plurality of first surface portions 48 of a first outer diameter and a plurality of second surface portions 49 of a second outer diameter smaller than the first outer diameter. Feed roller 43 is preferably constructed by machining a hollow cylinder to the configuration shown and then inserting end caps 44, 44'. Other methods of constructing feed roller 43 will occur to those skilled in the art.

A plurality of resilient pressure rollers 50 are mounted on a common shaft 51, each pressure roller 50 being in surface contact with a different surface portion 48 of feed roller 43. Common shaft 51 is rotatably carried at each end 58 by an irregularly shaped bearing member 52. The inner diameter of each bearing member 52 is dimensioned to rotatably receive reduced diameter end portion 58 of common shaft 51. Each bearing member 52 has a neck portion 53 sized to be received by a retaining slot 54 in side plates 30, 31. The pressure roller assembly comprising pressure rollers 50, shaft 51, and bearing members 52 is resiliently retained in slots 54 by a pair of retention springs 55. To install the pressure roller assembly, bearing members 52 are fitted onto the ends 58 of shaft 51 and neck portions 53 are lowered into slots 54. Each retention spring 55 is passed over a collar portion 56 of each bearing member 52, after which the ends of each spring 55 are secured in apertures 57 in side plates 30, 31. As noted above, pressure rollers 24 are mounted in main frame 12 in a similar manner.

When installed in the above manner, pressure rollers 50 frictionally rotate with feed roller 43 to provide an exit path feed for a document. Because of the resilient mounting afforded by retention springs 55, documents of varying thicknesses can be easily accommodated by the nip between pressure rollers 50 and surface portions 48 of feed roller 43 without the necessity for any adjustment.

Rockably mounted forward of feed roller 43 is a document diverting member 60 comprising a flap member 61 secured to a support rod 62. Support 62 is journaled at each end in a different bearing 63 mounted in side plates 30, 31. The right end of support rod 62 extends a sufficient distance to the right of side plate 30 to receive a control arm 64 (FIG. 4) for controlling the document diverting member 60 in the manner described below.

Flap member 61 is provided with three sets of arcuate tabs 65, 66, and 67. Tabs 65 are spaced and arranged along support rod 61 to lie adjacent the interstices between adjacent raised surface portions 48 of feed roller 43 in the assembled magazine 10, and serve to direct a document emerging from the nip between pressure rollers 50 and feed roller 43 in either an exit direction or a recycle direction, depending on the position of control arm 64. Tabs 67 extend in a generally downward direction and serve to direct a document diverted downwardly by tabs 65 toward a curved re-entry guide 68.

Curved re-entry guide 68, which serves to direct a downwardly diverted document to the entry feed path described below, is mounted below diverting member 60 on a pair of mounting blocks 70 by means of screws 71. As best seen in FIG. 5, each mounting block 70 has a curved rear surface portion 73 shaped to accommodate the curvature of re-entry guide 68. Mounting blocks 70 are each mounted to a different one of side plates 30, 31 by screws 72.

A latching mechanism 75, which comprises a flexible cable 76 and a pair of latch pin assemblies 77 is secured to the forward portion of side plates 30, 31 in the following manner. As best shown in FIG. 3, each latch pin assembly 77 comprises an outer cylindrical support member 80, an inner cylindrical member 81, a latch pin 82 and a spring 83. Outer cylindrical support member 80 has an axial bore for slidably receiving a reduced diameter portion 84 of latch pin 82 and an enlarged aperture for receiving an enlarged head portion 85 of latch pin 82. The inner end of outer cylindrical support member 80 has an externally threaded portion 87 of reduced diameter adapted to be received by a slot 88 in side plates 30, 31 and to threadably engage with an internally threaded portion 89 of inner cylindrical member 81. The inner end of inner cylindrical member 81 has an axial bore 90 for slidably receiving an end of cable 76.

To assemble, spring 83 is first fitted over portion 84 of latch pin 82, which is then inserted into the bore of member 80. An end of cable 76 is then passed through bore 90 of member 81 and secured to the inner end of latch pin 82 by any suitable means, e.g., welding. This procedure is followed for both assemblies 77, after which inner members 81 are loosely threaded onto outer members 80. Each assembly 77 is then fitted into a slot 88, after which inner members 81 are tightened to secure the now-completed latching mechanism 75 to side plates 30, 31. Once assembled, latch pins 82 may be retracted by merely pulling on the center of flexible cable 76. When cable 76 is released, springs 83 return latch pins 82 to their normally extended position.

A brace handle 92 is mounted forward of latching mechanism 75 on side plates 30, 31 by screws 93. Brace handle 92 provides an additional support member for side plates 30, 31 and also facilitates installation and removal of magazine 10 in main frame 12.

As will now be evident, magazine 10 may be simply installed in main frame 12 by positioning the outer ends of stub shafts 39 onto lower guide ledges 17, 17' and sliding magazine 10 rearwardly of main frame 12. When outer cylindrical members 80 have reached the mouth of guide tracks 15, 15', latch pins 82 are retracted by pulling on cable 76, using brace handle 92 for leverage. Outer cylindrical members 80 are then positioned onto lower guide ledges 17, 17' and magazine 10 may be then slid rearwardly until stub shaft slots 41 engage the above-noted main frame support member and latch pins 82 are aligned with their latch pin apertures 16 in side plates 14, 14'. Magazine 10 may then be locked in place by simply releasing cable 76, allowing each latch pin 82 to engage its corresponding aperture 16 under the influence of spring 83. Removal of magazine 10 is easily accomplished by merely retracting latch pins 82 and pulling of brace handle 92.

In the preferred embodiment, latch pin apertures 16 are located a sufficient vertical distance above lower guide ledges 17, 17' so that, once installed, magazine 10 is supported above lower ledges 17, 17' solely by latch pins 82 at the front and stub shafts 39 at the rear. This arrangement enables magazine 10 to be precisely positioned with respect to the elements mounted in main frame 12 and has been found to provide optimum results. If desired, however, the location of apertures 16 may be lowered so that lower guide ledges 17, 17' provide additional support for magazine 10.

As shown, latch pin apertures 16 extend into main frame side plates 14, 14'. If desired, however, shorter latch pins 82 may be used so that apertures 16 are confined to guide tracks 15, 15'.

As best shown in FIG. 4, with magazine 10 installed in main frame 12 a document entry feed path 100 is formed by bottom magazine plate 33 and lower main frame guide plate 20. Similarly, a document exit feed path 102 is formed by top magazine plate 32 and upper main frame guide plate 21. Document turnaround is provided by rear roller 35 and a moving flexible web 103 which is threaded over a pair of bias rollers 104, 105 and a portion of the surface of rear roller 35. In the preferred embodiment, web 103 comprises a zinc oxide coated paper web movable between a supply reel and a take-up reel, while rear roller 35 comprises a reflex roller having a highly reflective outer surface preferably of glazed white ceramic material. For a more elaborate disclosure of such a web and roller, reference may be had to U.S. Pat. No. 3,591,846 issued July 6, 1971, the disclosure of which is hereby incorporated by reference. Bias rollers 104, 105 are positioned to provide sufficient tension on web 103 when rear roller 35 is in place to cause roller 35 to be rotated in the direction of arrow 108 (clockwise in FIG. 4) by web 103 as this latter element is drawn in the direction of arrows 107.

Alternatively, when the invention is used in a copier environment of a different type, web 103 may comprise a sheet of photoconductive copy paper, e.g., zinc oxide coated copy paper, rather than a long continuous web, and either one or both of bias rollers 104, 105 may be driving rollers for feeding the sheet of copy paper in the direction arrows 107. In this arrangement, a diverting guide 110 shown in broken lines will be mounted adjacent rear roller 35 between rollers 104, 105. Other equivalent configurations for the document turnaround station suitable for use in a copier environment or other types of document processing machine environments will occur to those skilled in the art.

In operation, with power applied to driving gear 19, feed roller 43 will be rotated in the direction of arrow 112 (clockwise in FIG. 4) through driven gear 47. The surface friction between raised surface portion 48 of feed roller 43 and pressure rollers 24, 50 will cause these latter elements to rotate. When a document is thereafter introduced into entry chute 27 and fed into the nip between feed roller 43 and pressure rollers 24, it will be propelled rearward along entry path 100. When the leading edge of the document reaches the leading edge of the surface contact area between web 103 and roller 35 it will be drawn upward about the surface of roller 35 and subsequently fed along exit path 102 toward the front of the unit. With control arms 64 in the document exit position shown in full lines in FIGS. 4 and 5, the document will then be propelled by feed roller 43 and surface rollers 50 over arcuate tabs 65, 66 to an exit station.

If control arm 64 is moved to the alternate document recycle position shown in broken lines in FIGS. 4 and 5, a document emerging from the nip of feed roller 43 and pressure rollers 50 will be diverted downwardly by arcuate tabs 65, 67 and curved re-entry guide 68 to the nip between feed roller 43 and pressure rollers 24. Once having reached this nip, the document will be recycled along entry path 100 about roller 35 and along exit path 102. In this manner, a document may be recycled indefinitely until control arm 64 is returned to the document exit position. As will be apparent to those skilled in the art, control arm 64 may be operated by various manual or automatic mechanisms not necessary to an understanding of the invention.

As will now be evident, the above-described invention provides an extremely simple document transport mechanism which can be easily installed and removed by even an unskilled operator. Due to this ease of installation and removal and the design of the entry and exit feed paths 100, 102, any paper jams encountered in the operation of devices constructed according to the invention may be quickly and easily remedied by simply removing magazine 10, which exposes the interior of the original document feed path. Once the jam has been remedied (e.g., by removal of a wrinkled original document), magazine 10 may be quickly reinstalled and machine operation may be resumed with a minimum of down time. In this connection it is noted that, due to the fact that driven gear 47 disengages from driving gear 19 when magazine 10 is moved forward only a short distance, in cases of emergency it is not necessary to shut off power to driving gear 19 before removing magazine 10. This feature enables quick action to be taken to save a crushed or crumpled original and has been found in practice to significantly reduce the incidence of total destruction of an original document.

In addition, because of the relatively small number of working elements required in devices constructed according to the invention—e.g., the use of a single feed roller 43 to provide bidirectional propulsion of original documents—such devices have been found in practice to be extremely inexpensive to manufacture and to be highly reliable in operation.

While the foregoing provides a full disclosure of the preferred embodiment of the invention, it is understood that various modifications, alternate constructions and equivalents may be employed without departing from the true spirit and scope of the invention. For example, other arrangements than flexible web 103 and bias rollers 104, 105 may be employed in cooperation with rear roller 35 to provide a turnaround station for the original document. Therefore, the above description and illustrations should not be construed as limiting the scope of the invention, which is solely defined by the appended claims.

What is claimed is:

1. A document handling device comprising:
   a housing;
   a rotatable roller mounted at the rear of said housing;
   a feed roller rotatably mounted forward of said rear of said housing;
   a pressure roller rotatably mounted adjacent said feed roller in surface contact with portions of said feed roller surface;
   a document diverting member adjustable between a first position permitting document feed in a direction forward of said feed roller and a second position permitting document feed in a direction rearward of said feed roller; and
   a latching means mounted on the forward portion of said housing for releasably locking said document handling device to an associated main frame.

2. The apparatus of claim 1 further including a pair of stub shafts transversely fixed at the rear of said housing coaxially with respect to said rotatable roller, and wherein said rotatable roller is carried by the inner end portion of each of said shafts.

3. The apparatus of claim 1 wherein said feed roller comprises a cylindrical member having a first surface portion with a first outer diameter and flanking surface portions with a second outer diameter smaller than said first diameter, and wherein said pressure roller is mounted in surface contact with said first surface portion.

4. The apparatus of claim 1 wherein said feed roller comprises a cylindrical member having a plurality of first surface portions each of a first outer diameter and each separated by a plurality of second surface portions each of a second outer diameter smaller than said first outer diameter.

5. The apparatus of claim 4 further including a plurality of pressure rollers each mounted adjacent said feed roller in surface contact with a different one of said first surface portions.

6. The apparatus of claim 4 wherein said diverting member comprises a rockable support member disposed transversely of said housing forward of said feed roller, and a flap having a first set of arcuate tabs extending in a generally rearward direction, the end portions of said tabs being positioned in the interstices between said plurality of first surface portions when said document diverting member is in said first position, and a second set of arcuate tabs extending in a generally downward direction.

7. The apparatus of claim 1 wherein said diverting member comprises a rockable support member disposed transversely of said housing forward of said feed roller, and a flap having a first arcuate portion extending in a generally rearward direction when said member is in said first position and a second arcuate portion extending in a generally downward direction.

8. The apparatus of claim 1 wherein said latching means comprises a retractable pin normally extending transversely outwardly of said housing and means for retracting said pin.

9. The apparatus of claim 8 wherein said means for retracting said pin comprises a flexible cable.

10. A device for conveying a document along an entry path and an exit path comprising:
    a main frame having a pair of substantially parallel guide tracks, a lower guide plate and an upper guide plate;
    a removable document feed magazine mounted in said main frame comprising:
       a housing having an upper surface and a lower surface;
       guide means extending from said housing for sliding engagement with said guide tracks;
       a rotatable roller mounted at the rear of of said housing;
       a feed roller rotatably mounted forward of said rear of said housing;

at least one pressure roller rotatably mounted adjacent said feed roller in surface contact with a portion of said feed roller surface;

a document diverting member adjustable between a first position for ejecting said document from said device and a second position for guiding said document toward said entry path; and a latching means mounted forwardly of said feed roller for releasably locking said document feed magazine to said main frame;

at least one pressure roller rotatably mounted in said main frame substantially transversely of said guide tracks in surface contact with a portion of said feed roller surface;

a document deflector mounted rearwardly of said rotatable roller; and drive means mounted on said main frame for rotating said feed roller;

said lower housing surface and said lower main frame guide plate forming said entry path, said upper housing surface and said upper main frame guide plate forming said exit path, and said document deflector and said rotatable roller comprising a turnaround station when said magazine is mounted in said main frame.

11. The apparatus of claim 10 wherein said guide means comprises a pair of stub shafts transversely fixed at the rear of said housing coaxially with respect to said rotatable roller, said rotatable roller being carried by the inner end portion of each of said shafts, and a pair of support members transversely fixed at the front of said housing.

12. The apparatus of claim 10 wherein said feed roller comprises a cylindrical member having a plurality of first surface portions each of a first outer diameter and each separated by a plurality of second surface portions each of a second outer diameter smaller than said first outer diameter.

13. The apparatus of claim 10 wherein said latching means comprises at least one retractable pin normally extending transversely outwardly of said housing for engagement with one of said guide tracks, and means for retracting said pin.

14. The apparatus of claim 13 wherein said means for retracting said pin comprises a flexible cable.

15. The apparatus of claim 10 wherein said diverting member comprises a rockable support member disposed transversely of said housing forward of said feed roller, and a flap having a first arcuate portion extending in a generally rearward direction when said member is in said first position and a second arcuate portion extending in a generally downward direction.

16. The apparatus of claim 10 further including an entry chute mounted in said main frame for guiding said document toward said entry path.

17. The apparatus of claim 10 wherein said document deflector comprises a movable photoconductive web.

* * * * *